United States Patent [19]
Segawa et al.

[11] 4,312,562
[45] Jan. 26, 1982

[54] OPTICAL CONTROL DEVICE

[75] Inventors: Hideo Segawa, Tokyo; Jiro Koyama; Hiroshi Nishihara, both of Suita; Masamitsu Masuda, Toyonaka, all of Japan

[73] Assignee: Ricoh Co., Ltd., Tokyo, Japan

[21] Appl. No.: 122,823

[22] Filed: Feb. 19, 1980

[30] Foreign Application Priority Data

Feb. 19, 1979 [JP] Japan .................. 54/18058
Feb. 20, 1979 [JP] Japan .................. 54/18060

[51] Int. Cl.² .................................. G02B 5/14
[52] U.S. Cl. .................... 350/96.15; 350/96.14; 350/96.29
[58] Field of Search .............. 350/96.29, 96.13, 96.14, 350/96.15

[56] References Cited
U.S. PATENT DOCUMENTS

| | | | |
|---|---|---|---|
| 3,850,503 | 11/1974 | Riseberg et al. | 350/96.13 |
| 4,012,113 | 3/1977 | Kogelnik et al. | 350/96.13 |
| 4,086,484 | 4/1978 | Steensma | 350/96.29 |
| 4,127,320 | 11/1978 | Li | 350/96.13 |

Primary Examiner—Rolf G. Hille
Attorney, Agent, or Firm—Oblon, Fisher, Spivak, McClelland & Maier

[57] ABSTRACT

An optical control device having at least two optical fibers arranged extremely adjacent to each other over a certain distance so that the optical fibers are optically coupled to each other. Among optical waves propagating in one of the optical fibers, a particular optical wave which is selected by the propagation constants of the two optical fibers and the propagation constant of an ultrasonic applied to the one optical fiber is transmitted to the other optical fiber.

4 Claims, 11 Drawing Figures

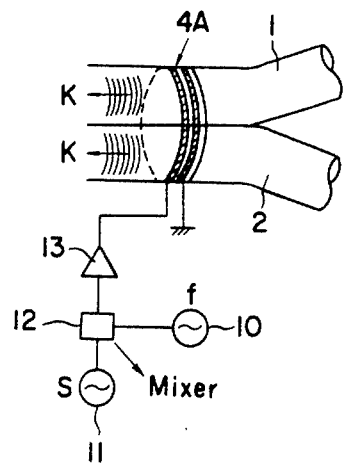
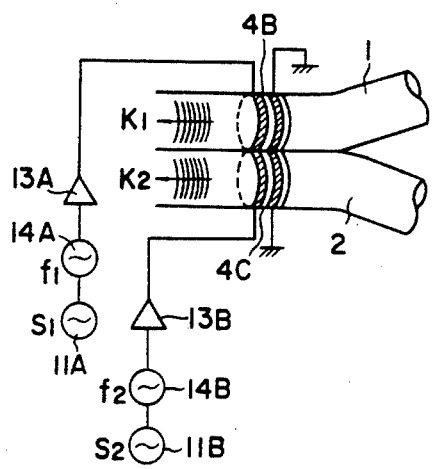
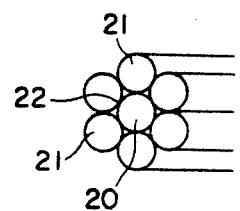

OPTICAL CONTROL DEVICE

BACKGROUND OF THE INVENTION

This invention relates to an optical control device used as an optical propagation element having active functions such as optical modulation and optical branching.

Heretofore, in the case where light propagating in an optical fiber is modulated or branched, an optical coupler is employed to couple the optical fiber to a wave conducting path.

Since an optical coupler of this type must be high in optical coupling efficiency, it is necessarily delicate in mechanism and intricate in construction. For instance, the thickness of a film-shaped optical wave conducting path used for optical modulation or branching is only several microns ($\mu$), and accordingly the requirements for positioning for optical coupling and for end face flatness are considerably severe. Thus, the optical coupler is still disadvantageous in that the optical arrangement is severe and the operation is difficult.

SUMMARY OF THE INVENTION

Accordingly, an object of this invention is to provide an optical control device in which the above-described drawbacks have been eliminated by giving active function to optical fibers which heretofore serve only as light propagating means.

The foregoing object and other objects of the invention have been achieved by the provision of an optical control device which, according to one aspect of the invention, comprises: a plurality of optical fibers arranged extremely adjacent to one another over a distance so that the optical fibers are optically coupled to one another; and ultrasonic transducer means mounted on the optical fibers, for exciting the optical fibers with ultrasonic waves equal or different in frequency and for propagating the ultrasonic waves substantially in parallel with the propagation direction of optical waves in the optical fibers, only a particular optical wave which is defined by the propagation constants of the optical waves and ultrasonic waves being selectively transmitted from one optical fiber to another optical fiber coupled thereto.

The objects of the invention have been achieved also by the provision of an optical control device which, according to another aspect of the invention, comprises: first and second optical fibers arranged extremely adjacent to one another so that the first and second optical fibers are optically coupled to each other; and ultrasonic transducer means arranged on one end of the first optical fiber or on one end of the first optical fiber at the junction of the first and second optical fibers, to propagate an ultrasonic wave in the first optical fiber substantially in parallel with the propagation direction of an optical wave propagating in the first optical fiber, the first and second optical fibers being selectively optically coupled according to an ultrasonic signal.

The nature, principle and utility of the invention will become more apparent from the following detailed description when read in conjunction with the accompanying drawings.

BRIEF DESCRIPTION OF THE DRAWINGS

In the accompanying drawings:

FIGS. 4 and 5 are block diagrams showing electrical circuits applicable to the ultrasonic transducers shown in FIGS. 2 and 3, respectively;

FIG. 6 is a perspective view showing the essential part of one example of a focusing type optical control device according to the invention;

DETAILED DESCRIPTION OF THE INVENTION

First, examples of an optical control device according to one aspect of this invention will be described with reference to FIGS. 1 through 6.

Figure 1:
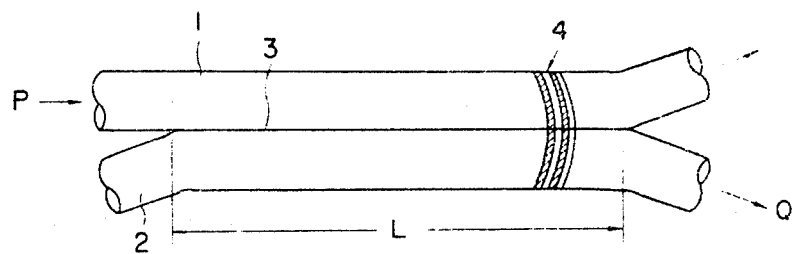
FIG. 1 is an explanatory diagram showing the arrangement of one example of an optical control device according to one aspect of this invention.

In a first example of the optical control device, two optical fibers 1 and 2 are optically coupled to each other as shown in FIG. 1. The optical fibers 1 and 2 are disposed sufficiently adjacent to each other so that the optical waves are suitably coupled to each other. More specifically, the optical fibers are so arranged that, when phase matching conditions are established between the optical fibers 1 and 2 and the coupling length L is a complete coupling length $L_o = \pi/2C$ (where C is the coupling coefficient of the two optical fibers), complete optical coupling is obtained therebetween.

An ultrasonic transducer 4 is provided at one end of an optical coupling section 3 between the optical fibers 1 and 2 so that an ultrasonic wave is propagated substantially in parallel with the propagation direction of the optical wave in the optical fiber 1. It is necessary that in the optical coupling section 3 the optical fibers 1 and 2 are sufficiently adjacent to provide the suitable coupling of the optical waves and that the mutual ultrasonic wave propagation is not obstructed by the coupling of the two optical fibers. For this purpose, the optical coupling section 3 is preferably a thin film having a relatively large refractive factor to which ultrasonic waves are not transmitted.

Figure 2:
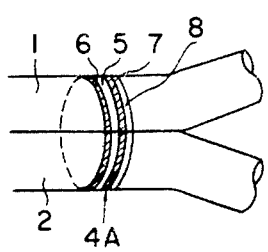
FIGS. 2 and 3 are explanatory diagrams showing two examples of an ultrasonic transducer applicable to the optical control device shown in FIG. 1.
Figure 3:
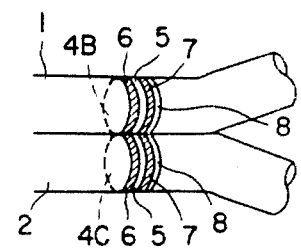

The ultrasonic transducer 4 may be mounted according to a system as shown in FIG. 2 or a system as shown in FIG. 3.

In the system of FIG. 2, an ultrasonic transducer 4A is in common for both of the optical fibers 1 and 2, and ultrasonic waves having the same frequency are applied to the optical fibers simultaneously.

In the system of FIG. 3, ultrasonic transducers 4B and 4C are provided for the optical fibers 1 and 2, respectively, and ultrasonic waves different in frequency are applied to the optical fibers.

In each system, each of the ultrasonic transducers 4A, 4B and 4C comprises: a piezo-electric film 5; transparent electrodes 6 and 7 disposed on both sides of the piezo-electric film 5; and a fiber optical coupling section 8 adjacent the transparent electrode 7.

The system in which ultrasonic waves having the same frequency are applied to the optical fibers 1 and 2 simultaneously will be described by way of example.

It is assumed that the propagation constant of the optical fiber 1 is $k_1$, the propagation constant of the optical fiber 2 is $k_2$, and the propagation constant of the ultrasonic waves is K. Then, when, in the case of $k_1 > k_2$, the following condition (1) is satisfied, the phase matching conditions are established between the optical fibers 1 and 2, and accordingly light applied to the optical fiber 1 can be shifted to the optical fiber 2, with the result that the optical fiber 2 provides an output light Q in response to an input light P to the optical fiber 1.

$$k_1 - K = k_2 + K \tag{1}$$

In the case where a number of optical waves different in propagation constant are propagated in the optical fiber 1, only the optical wave having an optical frequency or a propagation mode which meets the condition (1) is provided as the output light Q of the optical fiber 2.

In the system shown in FIG. 3 in which ultrasonic waves different in frequency are applied to the optical fibers, the optical waves which satisfy the following condition (2) can be coupled to each other between the optical fibers 1 and 2:

$$k_1 \pm K_1 = k_2 \pm K_2 \tag{2}$$

Excitation of the optical fibers with ultrasonic waves gives active function to the optical fibers themselves, thus resulting in the provision of an optical control device. This optical control device can be extensively employed as means for optical modulation, branching, mode selection, filter-type branching or coupling.

FIG. 4 shows one example of an electrical circuit for the ultrasonic transducer 4A in FIG. 2. An ultrasonic frequency signal f outputted by an ultrasonic wave generating oscillator 10 is modulated with a transmission signal S from a transmission signal source 11 in a mixer 12. The output of the mixer 12 is applied between the transparent electrodes 6 and 7 through an amplifier 13, so that the two optical fibers 1 and 2 are excited by the ultrasonic waves having the same frequency.

The electrical circuit shown in FIG. 4 may be applied to the ultrasonic transducers 4B and 4C in FIG. 3.

Another example of the electrical circuit which is suitable for the ultrasonic transducers 4B and 4C in FIG. 3 is illustrated in FIG. 5. Voltage-controlled oscillators 14A and 14B output ultrasonic frequency signals $f_1$ and $f_2$ with the aid of transmission signals $S_1$ and $S_2$ from transmission signal sources 11A and 11B, respectively. The output signals $f_1$ and $f_2$ are applied through amplifiers 13A and 13B to the transparent electrodes of the ultrasonic transducers 4B and 4C, respectively, so that the optical fibers 1 and 2 are excited by the ultrasonic waves different in frequency.

It is obvious that the electrical circuit shown in FIG. 5 may be applied to the device shown in FIG. 2, and that the electrical circuits shown in FIGS. 4 and 5 may be used in combination.

In the above-described devices, only two optical fibers are used for optical coupling; however, it should be noted that the invention is not limited thereto or thereby. That is, the device may be formed with a plurality of optical fibers as shown in FIG. 6. In the device shown in FIG. 6, a central optical fiber 20 is optically coupled to peripheral optical fibers 21 through optical coupling sections 22. In this case, the device has the same optical coupling function as those of the above-described devices.

In order to give an optical filtering function to the device, it is desirable to employ focusing type optical fibers or single mode optical fibers.

As is clear from the above description, according to the invention, a plurality of optical fibers arranged extremely adjacent to one another are excited with ultrasonic waves, and only the optical wave which is defined by the propagation constants of the optical waves and ultrasonic waves is transmitted from one optical fiber to another optical fiber. Therefore, unlike the conventional optical coupler, the optical control device according to the invention is high in optical coupling efficiency and can eliminate the drawbacks accompanying the conventional optical coupler that the optical arrangement is extremely severe and the operation is rather difficult.

Since optical fibers are extremely thin, electric power for ultrasonic excitation can be very low, which will undoubtedly contribute to the improvement of optical coupling efficiency.

Now, examples of the optical control device according to another aspect of the invention will be described with reference to FIGS. 7 through 11.

Figure 7:
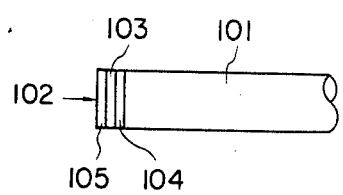
FIGS. 7 and 8 are a side view and a perspective view showing different examples of the ultrasonic transducer coupled to the optical fiber, respectively.

In the example shown in FIG. 7, an ultrasonic transducer 102 is provided on one end of an optical fiber 101. The ultrasonic transducer 102 comprises: a piezo-electric layer 103; and transparent electrodes 104 and 105 disposed on both sides of the piezo-electric layer 103. The piezo-electric layer 103 may be made of a ZnO film or a $LiNbO_3$ crystal film. The ZnO film is not so high in optical transmission factor; however, if its thickness is of the order of 1 to 3$\mu$, then the ZnO film can be satisfactorily used as the piezo-electric layer. The transparent electrodes 104 and 105 may be made of any material if it is transparent to light used. Examples of the material are Au, $SnO_2$ and $In_2O_3$.

Figure 8:
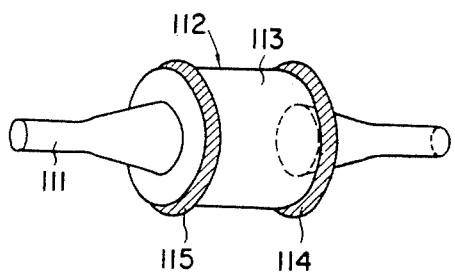

Shown in FIG. 8 is a transmission type ultrasonic transducer 112 which surrounds an optical fiber 111. The ultrasonic transducer 112 comprises: a piezo-electric cylinder 113 made of a $LiNbO_3$ crystal; and annular electrodes 114 and 115 provided on both end faces of the piezo-electric cylinder 113. With the ultrasonic transducer 112, electric power is applied to the piezo-electric cylinder 113 through the annular electrodes 114 and 115, to provide an ultrasonic wave. The ultrasonic wave thus provided is propagated in the optical fiber 111 substantially in parallel with an optical wave propagating in the optical fiber 111. The piezo-electric cylinder 113 should be joined to the optical fiber 111 satisfactorily in the structural view point so that the ultrasonic wave is effectively propagated therebetween, i.e. acoustic impedance matching is established therebetween. It goes without saying that construction must be so arranged that light propagation is efficiently carried out between the optical fiber 111 and the piezo-electric cylinder 113.

The core diameter of the optical fiber 101 or 111 used is usually 10 to 150$\mu$. Clad type (stepwise refractive index type) optical fibers and grated index type (focusing type) optical fibers are available. Single-mode optical fibers and multi-mode optical fibers are available for mode selectivity. According to the application, both the single-mode optical fiber and the multi-mode optical fiber can be used as the optical fibers of the optical control device of the invention. In order to give an optical wave frequency filtering function to the device, it is preferable to use the single-mode optical fiber or the grated index type optical fiber.

Figure 9:
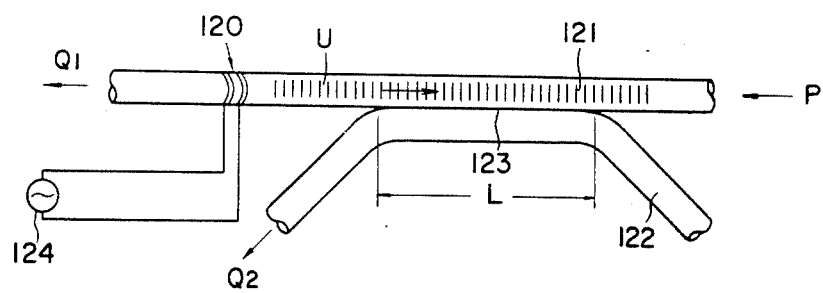
FIG. 9 is an explanatory diagram showing one example of an optical control device according to another aspect of the invention.

FIG. 9 shows one example of the entire arrangement of the optical control device according to the invention. A main optical fiber 121 with an ultrasonic transducer 120 and an auxiliary optical fiber 122 are arranged extremely adjacent to one another over a coupling length L so that optical waves can be transmitted satisfactorily through a coupling section 123 which is a solid or a liquid having a relatively high refractive index and ultrasonic waves are scarcely transmitted therethrough. The ultrasonic transducer 120 is so positioned that an ultrasonic wave U which is outputted by the ultrasonic transducer 120 when the latter 120 is energized through the two electrodes by an ultrasonic oscillator 124 is propagated to at least the region of the coupling section 123.

In FIG. 9, an input light P is applied to one end of the main optical fiber 121, which is opposite to the ultrasonic transducer 120 with respect to the coupling section 123. The ultrasonic transducer 120 causes the ultrasonic wave to propagate in a direction opposite to the direction of the input light P in the main optical fiber 121. In this case, in the coupling section 123 between the main optical fiber 121 and the auxiliary optical fiber 122, owing to the mutual action of the optical wave and the ultrasonic wave the propagation constant k of the optical wave is:

$$k = k_1 \pm K \quad (3)$$

where $k_1$ is the propagation constant of the main optical fiber, and $K$ is the propagation constant of the ultrasonic wave.

Therefore, when the propagation constant of the auxiliary optical fiber 122 meets the following condition (4)

$$k_2 = k \quad (4)$$

then phase matching conditions are established between the optical fibers 121 and 122. Therefore, when the coupling length L is equal to a complete coupling length $L_0 = \pi/2C$ (where C is the coupling constant between the two fibers), the optical wave inputted to the main optical fiber 121 is all transmitted to the auxiliary optical fiber 122; that is, it is provided as an output light $Q_2$ at the output end of the auxiliary fiber 122. If the ultrasonic output or frequency is changed according to the above-described principle, then the light transmitted to the auxiliary optical fiber, i.e. the output light $Q_2$ of the auxiliary optical fiber can be changed as desired.

Figure 10:
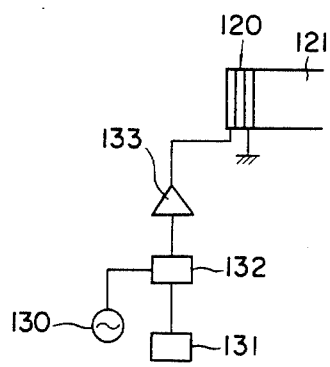
FIGS. 10 and 11 are block diagrams showing different examples of an electrical circuit applicable to the optical control device shown in FIG. 9.

An electrical circuit as shown in FIG. 10 can be used to change the ultrasonic output according to a transmission signal. Furthermore, an electrical circuit as shown in FIG. 11 may be employed to change the ultrasonic frequency according to a transmission signal.

In the circuit of FIG. 10, the ultrasonic output signal of an oscillator 130 is modulated with a transmission signal from a transmission signal generator 131 in a mixer 132. The output of the mixer 132 is applied through an amplifier 133 to the ultrasonic transducer 120, to change the ultrasonic output.

Figure 11:
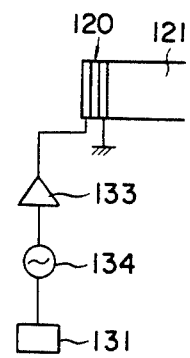

In the circuit of FIG. 11, the output frequency of a voltage-controlled oscillator 134 is changed by a transmission signal from a transmission signal generator 131, and the resultant output is applied through an amplifier 133 to the ultrasonic transducer 120, thereby to change the ultrasonic exciting frequency of the latter 120.

When a number of optical waves different in mode or frequency are propagated in the main optical fiber 121, only the optical wave having a mode or a frequency which meets the condition (4) is transmitted to the auxiliary optical fiber 122.

If the ultrasonic transducer 120 is modified so as to be a light transmission type one, then the optical control device can be operated in such a manner that the main optical fiber 121 is used as a main optical path which propagates a number of optical waves different in mode, and the auxiliary optical fiber 122 is used to selectively propagate a particular optical wave.

Thus, the optical control device according to the invention can be used as (a) a single optical wave modulating and branching device, and (b) a mode selecting device which selects only an optical wave having a particular frequency or propagation mode out of a number of optical waves.

As is apparent from the above description, according to the invention, an optical control device having the above-described functions (a) and (b) owing to the mutual action of the ultrasonic wave in the main optical fiber and the optical wave in the main optical fiber can be provided. Accordingly, unlike the conventional system using an optical coupler, the optical control device of the invention is high in optical coupling efficiency and can eliminate the drawbacks that the optical arrangement is considerably severe and the operation is difficult.

What is claimed is:

1. A optical control device comprising: a plurality of optical fibers arranged extremely adjacent to one another over a distance so that said optical fibers are optically coupled to one another; and ultrasonic transducer means arranged inside of said optical fibers, said means including transparent electrodes disposed on both sides of a piezo-electric film for exciting said optical fibers with ultrasonic waves equal or different in frequency and for propagating said ultrasonic waves substantially in parallel with the propagation direction of optical waves in said optical fibers, only a particular optical wave which is defined by the propagation constants of said optical waves and ultrasonic waves being selectively transmitted from one optical fiber to another optical fiber coupled to said one optical fiber.

2. A device as claimed in claim 1, in which the number of said ultrasonic transducer means is one.

3. A device as claimed in claim 1, in which said ultrasonic transducer is provided for each of said plurality of optical fibers.

4. An optical control device comprising: first and second optical fibers arranged extremely adjacent to one another over a distance so that said first and second optical fibers are optically coupled to each other; and ultrasonic transducer means arranged or on one end of said first optical fiber at the junction of said first and second optical fibers, to propagate an ultrasonic wave in said first optical fiber substantially in parallel with the propagation direction of an optical wave propagating in said first optical fiber, said first and second optical fibers being selectively optically coupled according to an ultrasonic signal.

* * * * *